United States Patent
Cummings (10) Patent No.: US 7,028,640 B1
(45) Date of Patent: Apr. 18, 2006

(54) PET TRAINING DEVICE

(76) Inventor: James C. Cummings, 7 Walnut Run, Fairport, NY (US) 14450

( * ) Notice: Subject to any disclaimer, the term of this patent is extended or adjusted under 35 U.S.C. 154(b) by 0 days.

(21) Appl. No.: 11/167,486

(22) Filed: Jun. 27, 2005

Related U.S. Application Data (62) Division of application No. 10/404,727, filed on Apr. 1, 2003, now Pat. No. 6,953,007.

(60) Provisional application No. 60/369,767, filed on Apr. 3, 2002.

(51) Int. Cl.
*A01K 15/02* (2006.01)

(52) U.S. Cl. ..................... 119/712; 119/51.01

(58) Field of Classification Search ............ 119/51.01, 119/51.03, 174, 215, 712; 604/60, 61, 62, 604/63; 221/268, 270; 401/63, 82, 150, 401/181, 182
See application file for complete search history.

(56) References Cited

U.S. PATENT DOCUMENTS

| | | | |
|---|---|---|---|
| 2,513,014 A | 6/1950 | Fields | |
| 2,587,364 A | 2/1952 | Mitchell | |
| 2,601,852 A * | 7/1952 | Wendt | 604/59 |
| 2,650,593 A | 9/1953 | Weil et al. | |
| 2,764,590 A | 7/1956 | Cohen | |
| 3,238,941 A | 3/1966 | Klein et al. | |
| 3,669,310 A | 6/1972 | Zackheim | |
| 3,757,781 A | 9/1973 | Smart | |
| 3,934,584 A | 1/1976 | Corio | |
| 4,040,422 A * | 8/1977 | Kuhn | 604/79 |
| 4,060,083 A * | 11/1977 | Hanson | 604/59 |
| 4,578,055 A | 3/1986 | Fischer | |
| 4,637,816 A | 1/1987 | Mann | |
| 4,801,263 A * | 1/1989 | Clark | 433/90 |
| 5,584,805 A * | 12/1996 | Sutton | 604/60 |
| 5,816,804 A | 10/1998 | Fischer | |
| 6,123,683 A | 9/2000 | Propp | |

\* cited by examiner

*Primary Examiner*—Robert P. Swiatek
(74) *Attorney, Agent, or Firm*—Patent Innovations LLC; John M. Hammond (57) ABSTRACT

A device for pet training comprising a rigid tube formed with at least one elbow, and having a cavity in at least the distal end thereof for insertion of edible rewards therein; a handle, attached at the proximal end of the rigid tube, a flexible plunger rod disposed within the rigid tube, comprising a proximal end extending through the handle, and a distal end extending proximate to the cavity in the distal end of the rigid tube; a thumb ring joined to the proximal end of the flexible plunger rod; and a plunger disposed within the cavity and joined to the distal end of the flexible plunger rod, wherein a user of the device may hold the rigid tube by the handle, move the thumb ring, and cause an edible reward to be dispensed from the cavity on the distal end of the rigid tube.

7 Claims, 8 Drawing Sheets

PET TRAINING DEVICE

CROSS-REFERENCE TO RELATED PATENT APPLICATIONS

This application is a divisional application of the applicant's U.S. patent application Ser. No. 10/404,727, filed Apr. 1, 2003, and now U.S. Pat. No. 6,953,007 B1 which claims benefit of 60/369,767, filed Apr. 3, 2002.

BACKGROUND OF THE INVENTION

1. Field of the Invention

An apparatus to assist with the training of domestic animals, and more particularly to training of a canine, with which small edible rewards may be dispensed to the canine.

2. Description of Related Art

The present invention is a pet training device comprising a down-tube having a cavity on its lower end thereof for insertion of edible rewards; a handle, and means for causing an edible reward to be dispensed from the cavity on the lower end of the down-tube. The device may be used to selectively dispense edible rewards to a pet as compensation for exhibiting a desired behavior or performing a desired action.

Heretofore, a number of patents and publications have disclosed training assist devices for domestic animals, the relevant portions of which may be briefly summarized as follows:

U.S. Pat. No. 3,837,142 to Hill, issued Sep. 24, 1974, U.S. Pat. No. 5,566,645 to Cole, issued Oct. 22, 1996, and U.S. Pat. No. 5,809,939 to Robart et al., issued Sep. 22, 1998 each disclose a training device comprising a bit with a liquid delivery system therein for equine training. While these equine training devices are satisfactory for their intended use, they have no structure in common with the present invention, and no utility in canine training.

U.S. Pat. No. 3,984,000 to Miller, issued Oct. 5, 1976, teaches the use of a pellet-dispensing sleeve comprising an elongated resilient plastic tube slit along its length for the delivery of medicinal pellets. The disclosure is limited to the description of a sleeve only, and no associated mechanism. The present invention does not comprise such a resilient sleeve.

U.S. Pat. No. 5,806,466 to Pintor, et al., issued Sep. 15, 1998, discloses a pet training device comprising a thigh strap, a coupling mechanism, and at least one training strap having a coupling between the thigh strap and the collar of a canine. The device of Pintor is useful in limiting the mobility of a canine relative to its trainer, and has no provisions for providing edible rewards to the canine.

Accordingly, embodiments of the present invention are provided that meet at least one or more of the following objects of the present invention:

It is, therefore, an object of this invention to provide a pet training device, which can dispense edible rewards at substantially the standing or sitting height of a canine.

It is a further object of this invention to provide a pet training device, which enables a trainer to dispense edible rewards to a canine in an ergonomically sound manner.

It is an additional object of this invention to provide a pet training device, which can dispense edible rewards made from a variety of foodstuffs.

It is a further object of this invention to provide a pet training device, which can dispense edible rewards to a canine in a controlled and repeatable manner.

It is yet another object of this invention to provide a pet training device, which can be easily disassembled, cleaned, and reassembled.

SUMMARY OF THE INVENTION

In accordance with the present invention, there is provided a pet training device comprising a rigid tube formed with a proximal end, at least one elbow, and a distal end; a handle, attached at said proximal end of said rigid tube; a flexible plunger rod disposed within said rigid tube, comprising a proximal end extending through said handle, and a distal end extending proximate to said distal end of said rigid tube; a thumb ring joined to said proximal end of said flexible plunger rod; a plunger joined to said distal-end of said flexible plunger rod; and a dispensing assembly comprising a tee having an inner branch joined to said distal end of said rigid tube; a center port including a storage tube joined thereto for storage of edible rewards; an outer branch; and a breech disposed between said inner branch, said center port, and said outer branch, wherein said plunger is disposed in at least a portion of said inner branch of said tee and said plunger is displaceable through said breech of said tee.

In accordance with the present invention, there is further provided a pet training device comprising a rigid tube formed with a proximal end, at least one elbow, and a distal end; a handle, attached at said proximal end of said rigid tube; a flexible plunger rod disposed within said rigid tube, comprising a proximal end extending through said handle, and a distal end extending proximate to said distal end of said rigid tube; a thumb ring joined to said proximal end of said flexible plunger rod; a plunger joined to said distal-end of said flexible plunger rod; and a dispensing assembly comprising a tee having an inner branch joined to said distal end of said rigid tube; a center port including a storage tube joined thereto for storage of edible rewards; an outer branch; and a breech disposed between said inner branch, said center port, and said outer branch, wherein said plunger is disposed in at least a portion of said inner branch of said tee and said plunger is displaceable through said breech of said tee; and a plate-like bite shield joined to said outer branch of said tee, said bite shield having a diameter sufficient to prevent a pet from engaging said bite shield between its teeth.

In additional embodiments, the invention may further comprise a reservoir joined to the proximal end of the rigid tube; and a leash, attached to the device. The device may be made of at least about 90 weight percent of plastic. The device may include at least one edible reward for dispensation to a canine or other pet.

One aspect of the invention is based on the observation of problems with conventional canine training, in which rewards are dispensed by hand to the canine to compensate desired behavior. Due to the generally small stature of canines compared to humans, it is often necessary for the trainer to squat or bend over to dispense the reward directly to the canine at its level. For many trainers, this is an uncomfortable and ergonomically undesirable action. Furthermore, the dispensing of a reward at the level of the canine's mouth is believed to discourage jumping.

Alternatively, the canine may become aware that the rewards are kept upon the trainer's person, typically at least at waist level or higher. The canine will begin to beg for additional rewards, or at least become distracted by their presence upon the trainer.

This aspect is based on the discovery of a technique that alleviates these problems by providing individually dispensable edible rewards to a canine at its level, particularly through the use of an apparatus designed to dispense rewards at a position adjacent the canine's mouth. The present invention described above is advantageous because it makes it unnecessary to bend over or squat to provide a reward to a canine during training, and because the manner in which edible rewards are handled is not a distraction to the canine during training.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements.

Figure 1:
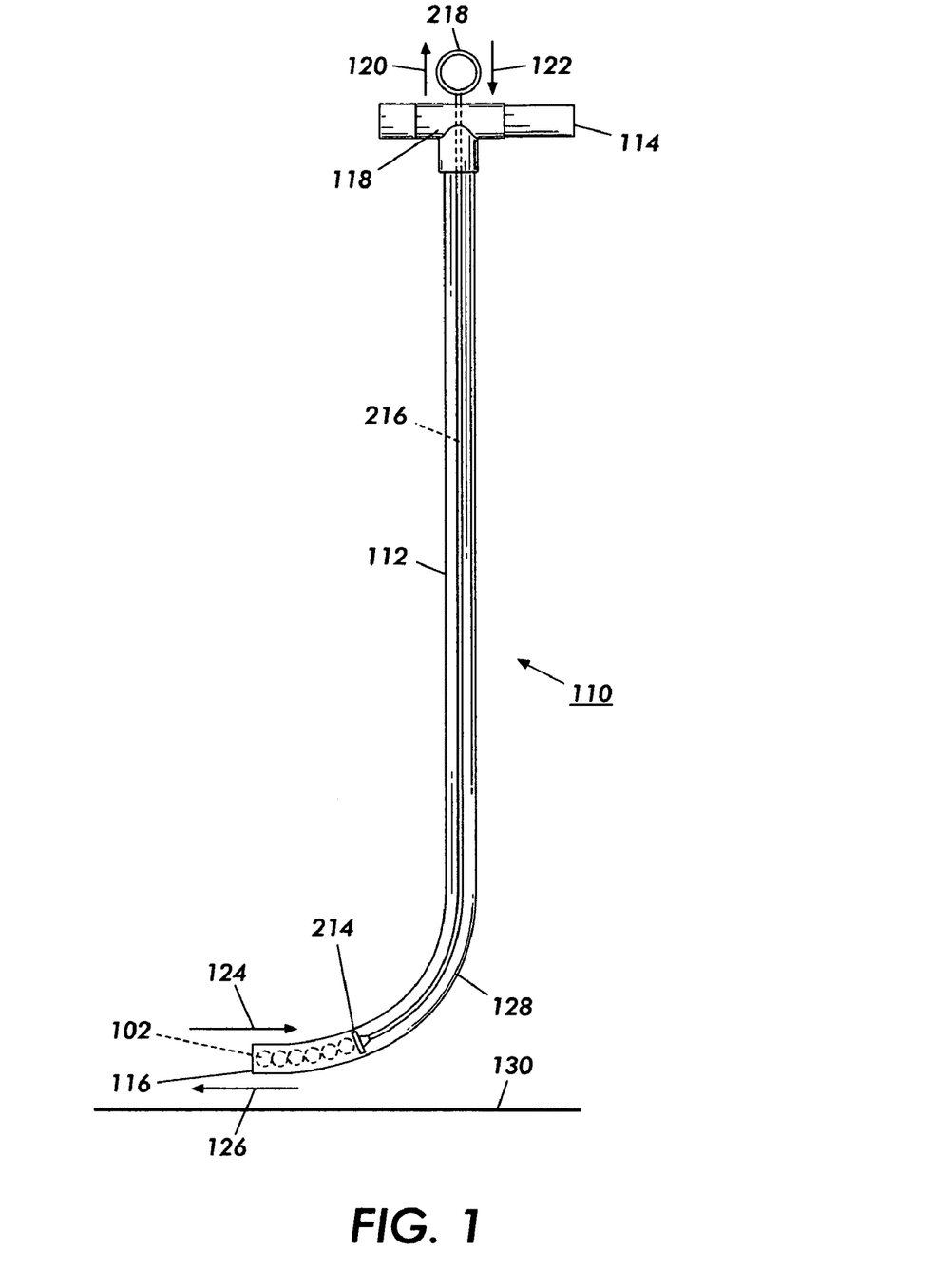
FIG. 1 is a side elevation view of one embodiment of the applicant's pet training device, in an assembled state.

Referring to FIG. 1, applicant's pet training device 110 comprises down-tube 112, which is joined at the upper end thereof to handle 114. Down-tube 112 comprises a cavity 116 at its lower end, into which may be inserted edible rewards 102, for subsequent dispensation to a canine or other animal as compensation for desired behavior.

Figure 2:
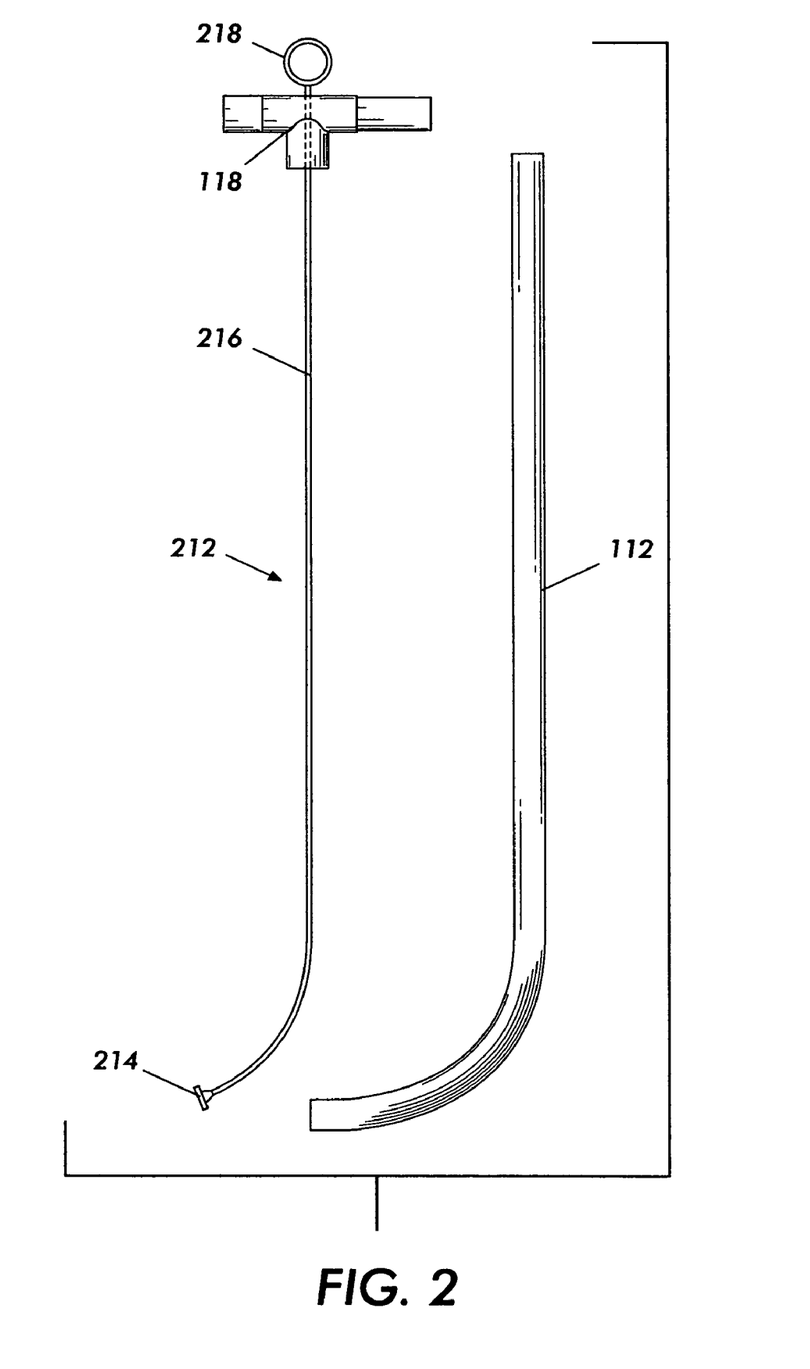
FIG. 2 is a side elevation view of one embodiment of the applicant's pet training device, in a partially assembled state.

Applicant's pet training device further comprises dispensing means for the controlled, individual discharge of edible rewards from the cavity 116 of down-tube 112. Referring also to FIG. 2, in one preferred embodiment, dispensing means 212 comprises plunger 214, which is operatively joined to the lower end of plunger rod 216. Plunger rod 216 is further joined at its upper end to thumb ring 218. In one preferred embodiment, down-tube 112 is a cylindrical tube, and plunger 214 comprises a cylindrical plug, with a diameter approximately 50 to 99 percent of the inside diameter of down-tube 112, and preferably approximately 90 to 95 percent of the inside diameter of down-tube 112. The length of the cylindrical plug of plunger 214 is preferably between 0.2 and 2 times the inside diameter of down-tube 112.

Referring again to FIG. 2, dispensing means 212 comprises plunger rod 216 (shown in phantom) disposed substantially axially along the length of down tube 112. The upper end of plunger rod 216 extends upwardly through a hole in joint 118, which secures handle 114 to down-tube 112.

In preparation for a training session, thumb ring 218 may be grasped and pulled upwardly, away from joint 118 in the direction of arrow 120 of FIG. 1. This action results in a corresponding displacement of plunger 214, which is attached to the opposite end of plunger rod 216, in the direction of arrow 124. This motion of plunger 214 increases the volume of the cavity 116 located at the lower end of down-tube 112. Edible rewards 102 are then loaded into cavity 116.

Figure 4:
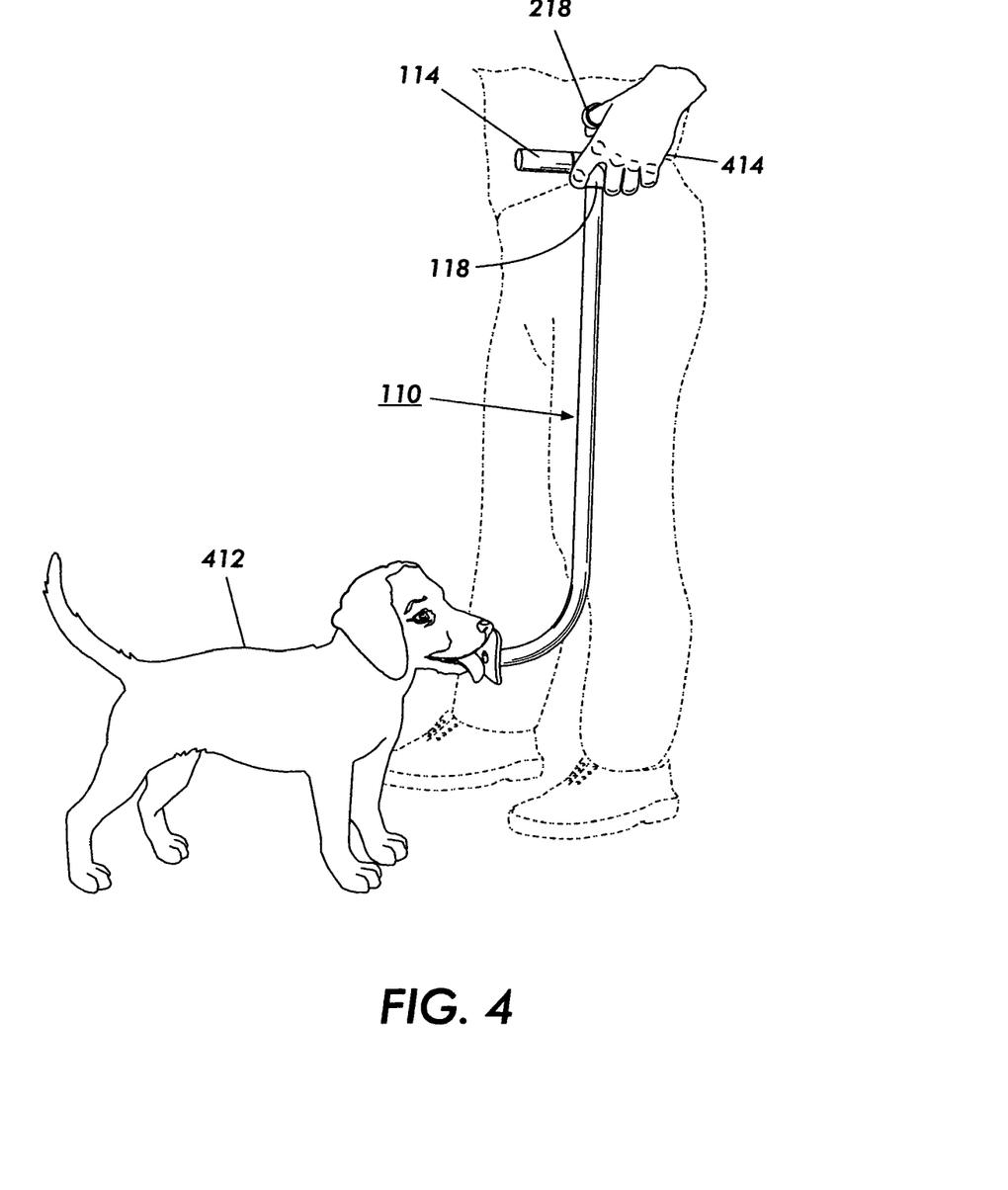
FIG. 4 is an illustration of one embodiment of the applicant's pet training device shown in use in dispensing a reward.

Referring to FIGS. 1 and 4, the pet training device 110 is preferably grasped by the trainer 414 with at least three fingers upon the handle 114 and/or joint 118, and with the thumb engaged with thumb ring 218. In the course of a training session, when the canine-in-training 412 exhibits a desired behavior, the trainer 414 pushes his thumb downwardly an incremental distance, forcing thumb ring 218 downwardly in the direction of arrow 122 of FIG. 1. Plunger 214, which is operatively joined to thumb ring 218 by plunger rod 216, is displaced a corresponding incremental distance within down-tube 112 in the direction of arrow 126. The incremental distance is preferably on the order of the length of one edible reward contained within cavity 116 of down-tube 112. Accordingly, one of edible rewards 102 is dispensed from down tube 112 for the enjoyment of the canine as compensation for his desired behavior.

Referring again to FIG. 1, in one preferred embodiment of the present invention, down-tube 112 further comprises an elbow 128, which disposes cavity 116 in a direction substantially parallel with the surface of the ground as represented by line 130. This feature has the benefit of dispensing an edible reward substantially horizontally, directly into the mouth of the canine. In addition, if the chosen edible rewards 102 are substantially spherical or cylindrical pellets of a diameter at least slightly less than the inside diameter of cavity 116 of down-tube 112, the edible rewards 102 will remain within cavity 116 until they are dispensed by the actuation of dispensing means 212 of FIGS. 1 and 2, as previously described.

The pet training device preferably comprises commonly available inexpensive, lightweight materials, such as plastic, or thin-wall metal tubing. In one preferred embodiment shown in FIGS. 1 and 2, pet training device 112 is fabricated of polyvinyl chloride (PVC) socket weld plastic pipe and fittings sold in commercial and retail plumbing and electrical supply stores. Down-tube 112 and handle 114 are made of one-half inch Schedule 40 PVC pipe, and joint 118 is a one-half inch Schedule 40 PVC tee. It is to be understood that the dimensions and schedules of plastic pipe and fittings as described herein are as defined by the Plastics Pipe Institute, and are further described in *Machinery's Handbook*, $22^{nd}$ ed., pp. 2339–2342, the disclosure of which is incorporated herein by reference.

It will be apparent that alternative materials would be suitable, such as EMT thin wall steel electrical conduit and fittings, or thin wall aluminum tubing and fittings, and the like. However, the fabrication of the applicant's pet training device with PVC pipe and socket weld fittings is preferable, because the device may be easily assembled for use, and disassembled for cleaning or transporting. In general, the pipe and fittings comprising the applicant's pet training device are not permanently welded together, but instead are force-fitted together. It is widely understood that socket weld pipe and fittings are dimensionally matched to be snugly force-fitted together prior to welding, for common plumbing applications. Such force fitting is sufficient for their use in the present invention, without permanent welding or gluing.

In the preferred embodiment of FIGS. 1 and 2, dispensing means 212 are also fabricated of polyvinyl chloride (PVC). Thumb ring 218 is made of an approximately one-inch length of one inch Schedule 40 PVC pipe. Plunger rod 216 is made of 0.1875-inch diameter grey PVC rod commonly used in the welding of PVC parts. Plunger 214 is made of 0.5-inch diameter grey PVC rod. Thumb ring 218 and plunger 214 each have holes of approximately 0.1875 inch diameter drilled therein. In fabrication of dispensing means 212, the opposite ends of plunger rod 216 are coated with PVC pipe cement and inserted into the respective holes in thumb ring 218 and plunger 214. Upon complete drying of the cement, thumb ring 218 and plunger 214 are suitably operatively joined to plunger rod 216.

It will be apparent that alternative materials would be suitable for dispensing means 212 of FIGS. 1 and 2, provided that the plunger rod 216 is sufficiently flexible to enable it to be easily displaced in down-tube 112, particularly in the curved section therein, by the movement of thumb ring 218, while also being rigid enough to force a corresponding displacement in the position of plunger 214. For example, one could use a tightly wound wire spring with an expansion at one end as a dispensing means. Such a device is typically used in the cleaning of drain piping and is also commonly referred to as a "plumbing snake".

The down-tube 112 and dispensing means 212 of the present invention of FIGS. 1 and 2 may also be selected according to the size of the desired reward to be dispensed and/or the size of the canine to be trained. In one further embodiment, down-tube 112 was fabricated of cross-linked polyvinyl chloride (CPVC) tubing of 0.375-inch inside diameter, with a correspondingly sized dispensing means 212 to be fitted therein.

Figure 3:
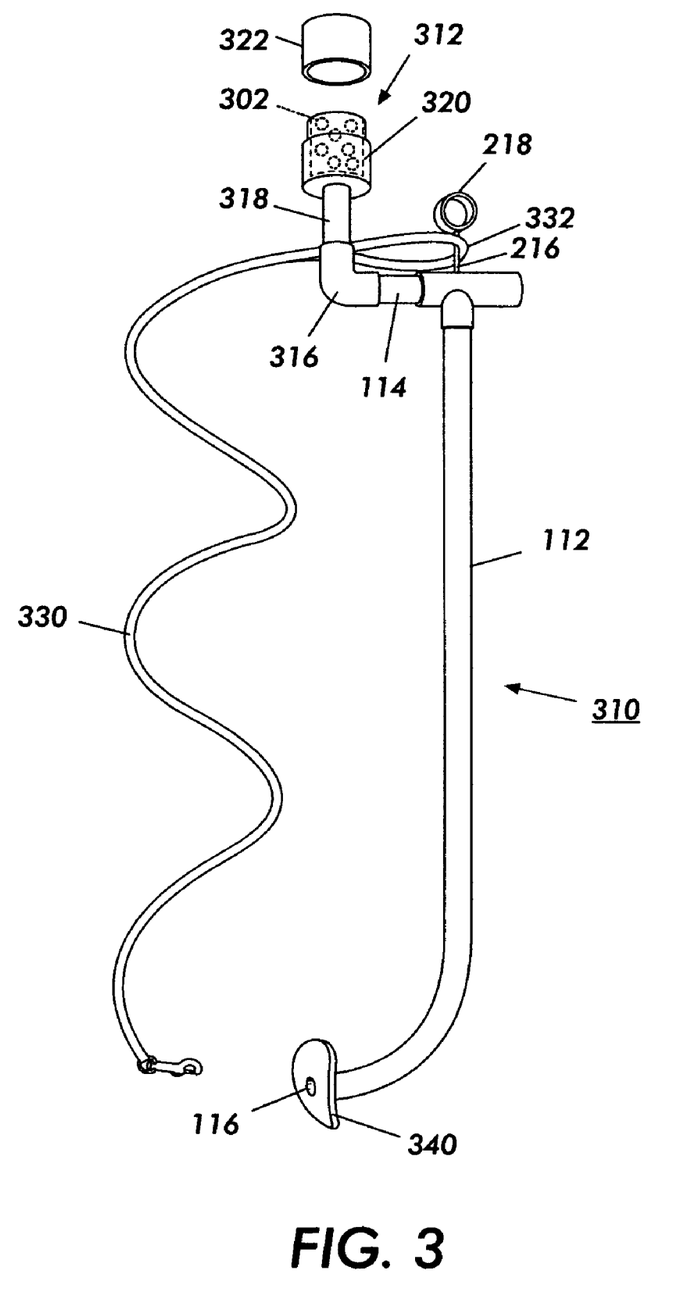
FIG. 3 is a side elevation view of a further embodiment of the applicant's pet training device.

FIG. 3 is a side elevation view of a further embodiment 310 of the applicant's pet training device, comprising several optional but desirable features. Referring to FIG. 3, the lower end of down tube 112 further comprises a bite shield 340, which prevents the canine, particularly a pup, from biting, chewing or sucking on the end of the down-tube in an attempt to dislodge a reward from cavity 116. In one embodiment, bite shield 340 comprises a three-inch diameter circular section cut from a piece of four-inch Schedule 40 PVC pipe. Bite shield 340 is joined to down-tube 112 with PVC pipe cement as previously described in regard to the assembly of dispensing means 212 of FIG. 2. Bite shield 340 is preferably between two inches and five inches in diameter (or in width across its narrowest section), in order to prevent a canine from engaging bite shield 340 between its teeth.

A further embodiment of the present invention may also comprise a storage reservoir for the carrying of additional edible treats during an extended training session. Referring to FIG. 3, in one preferred embodiment, reservoir assembly 312 comprises an elbow 316 attached to handle 114, with one leg of elbow 316 directed substantially upward. Into elbow 316 is fitted tube 318, to which is joined cup 320, which may contain additional edible rewards 302. Cap 322 may be fitted over the top of cup 320, to prevent spillage of edible rewards 302 during a training session. In one embodiment, reservoir assembly 312 comprises PVC pipe and fittings as previously described for other embodiments of the present invention. It will be apparent that the provision of a reservoir may be accomplished in many alternative ways, with the general functional requirement being that the reservoir is suitably joined to the upper end of down tube 112 such that the reservoir is within easy reach of the trainer.

In a further embodiment (not shown), reservoir assembly 312 may be combined with a dispensing means comprising a flexible auger instead of a plunger rod, such that edible treats could be conveyed from the cup 320 of reservoir assembly 312 to the cavity 116 of down tube 112. In such an embodiment, the user would control the motion of the auger or otherwise selectively control the dispensing of such treats from the end of the down-tube.

FIG. 3 also depicts the capability to engage a leash with the pet training device. In one embodiment, hand loop 332 of leash 330 is placed around plunger rod 216. Alternatively, hand loop 332 could be placed around reservoir assembly 312. It will be apparent that numerous other fittings for attaching objects to piping and tubing, particularly in the mounting or hanging of such objects, are known in the art, which would provide suitable attachment means for securing a leash to the applicant's pet training device. Similarly, various latches, rings, etc. may be employed so as to allow the leash to be selectively attached and detached from the pet training device 110.

Figure 5:
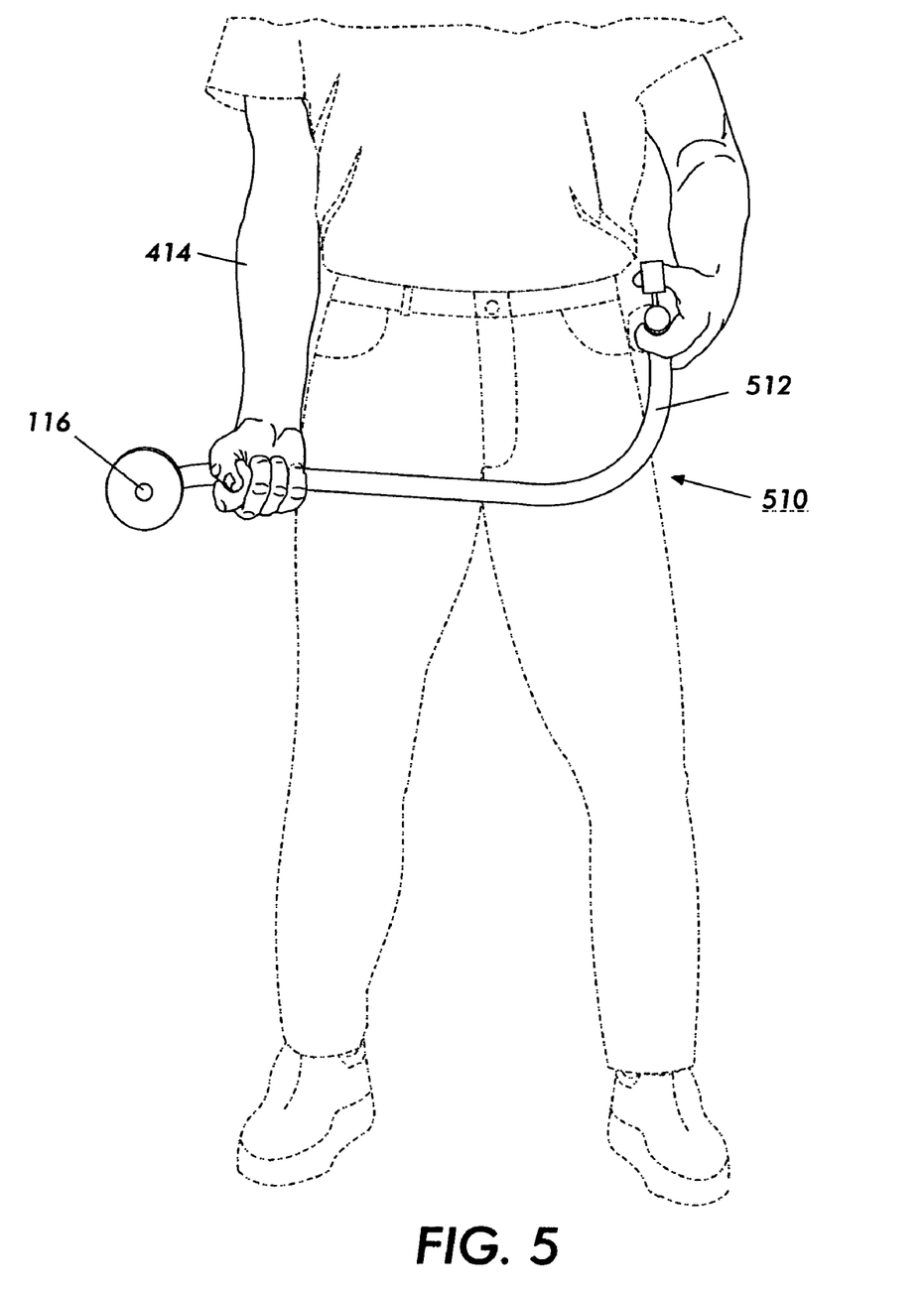
FIG. 5 is a front elevation view of another embodiment of the applicant's pet training device, for providing edible rewards to a larger variety of canine pet.

In general, the length of the down-tube of the applicant's pet training device may be chosen to provide the dispensing cavity of the device at a particular height above the floor, which is well matched to the size of the particular canine being trained. An alternate embodiment of the present invention is provided, which may be used in the training of larger canines. Referring to FIG. 5, applicant's pet training device 510 comprises a down tube 512, the majority of the length of which is disposed in a substantially horizontal direction. The resulting height of the dispensing cavity 116 of pet training device 110 is at substantially the hip level of the trainer 414, which is at a preferable height for training of large canines.

Figure 6:
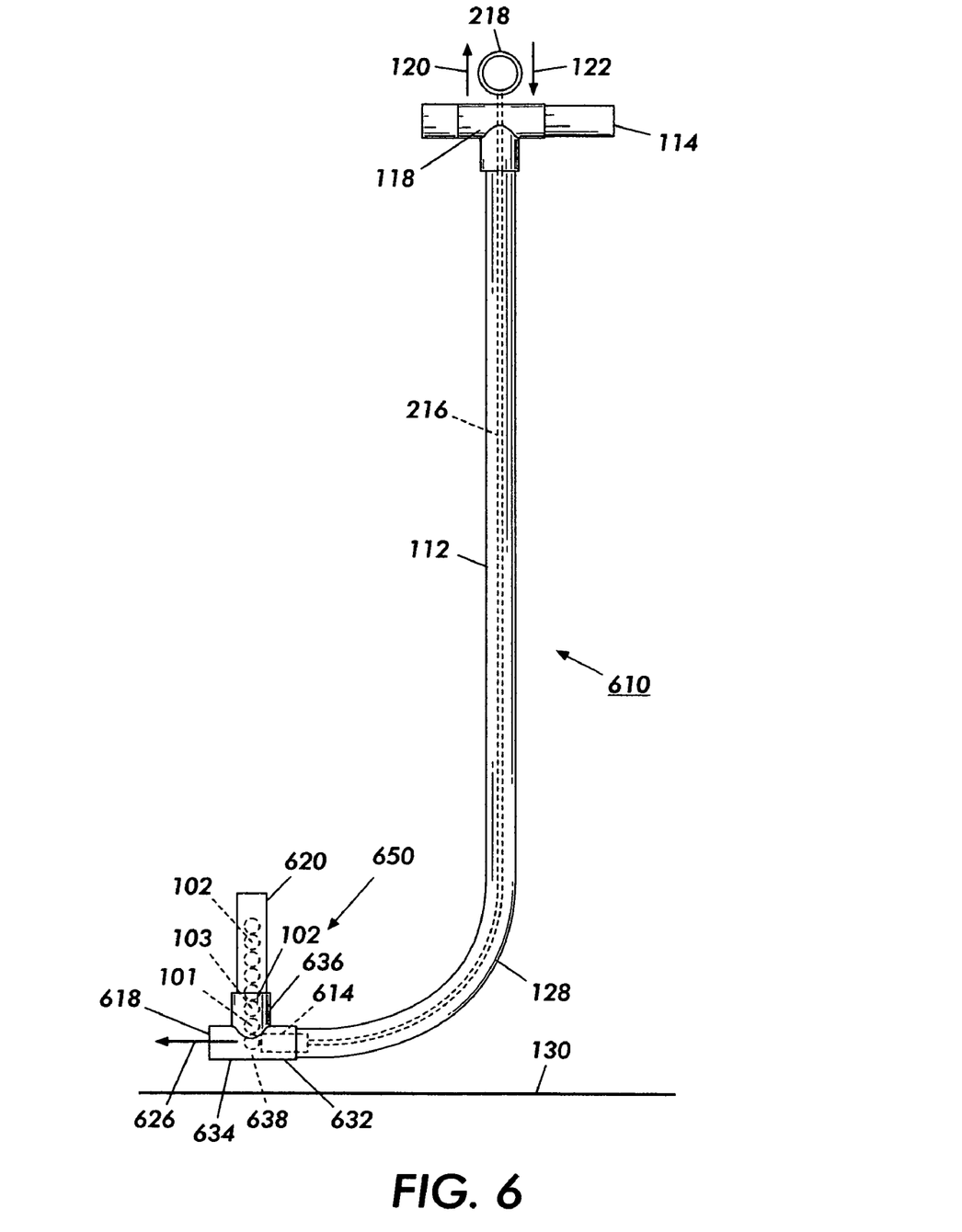
FIG. 6 is a front elevation view of another embodiment of the applicant's pet training device, for providing edible rewards directly from a reservoir attached thereto.

FIG. 6 is a front elevation view of another embodiment of the applicant's pet training device, for providing edible rewards directly from additional dispensing means comprising reward storage means attached thereto. Referring to FIG. 6, apparatus 610 is similar to apparatus 110 of FIG. 1, but further comprises dispensing assembly 650 comprised of dispensing tee 618 joined at an inner branch 632 thereof to the lower end of downtube 112. Reward storage tube 620 is joined to the center port 636 of tee 618, and the outer branch 634 of tee 618 is open, for the dispensing of rewards therefrom.

In operation, a plurality of edible rewards 102 are loaded into storage tube 620. Plunger 614 is withdrawn backwards into downtube 112 a sufficient distance by the operation of thumb ring 218 in the direction of arrow 120 as previously described, so that a single edible reward 101 drops into the breech 638 of tee 618, as depicted in FIG. 6. Plunger 614 is then displaced outwardly in downtube 112 by the operation of thumb ring 218 in the direction of arrow 122, thereby dispensing edible reward 101 out of outer branch 634 as indicated by arrow 626. Plunger 614 is provided in a sufficient length such that reward 103 is prevented from dropping downwardly behind plunger 614 and jamming plunger 614 in the breech 638. (In general, plunger 614 is preferably at least as long as the distance from the centerline of tee 618 to the open end of outer branch 634. With such a plunger length, the dispensing of a reward without jamming is consistently achieved.)

Plunger 614 is then withdrawn backwards into downtube 112 a sufficient distance by the operation of thumb ring 218 in the direction of arrow 120 that edible reward 103 drops into the breech 638 of tee 618, and the dispensing cycle may then be repeated. The withdrawal of plunger 614 backwards into downtube 112 may be facilitated by assist means (not shown) such as e.g., a wound spring disposed around rod 216 between ring 218 and tee 118, or such withdrawal may be entirely performed by the user of the device.

It will be apparent that the dispensing assembly 650 of FIG. 6 may be easily adapted to the apparatus 510 of FIG. 5, and, that the bite shield 340 of the apparatus 310 of FIG. 3 may be easily adapted to the outer branch 634 of tee 618. It will be apparent that dispensing assembly 650 may be provided as an optional attachment that may be provided and/or sold separately from the device 110 of FIG. 1, but with plunger 214 of device 110 preferably being formed similar to plunger 614 of device 610 of FIG. 6.

Figure 7A:
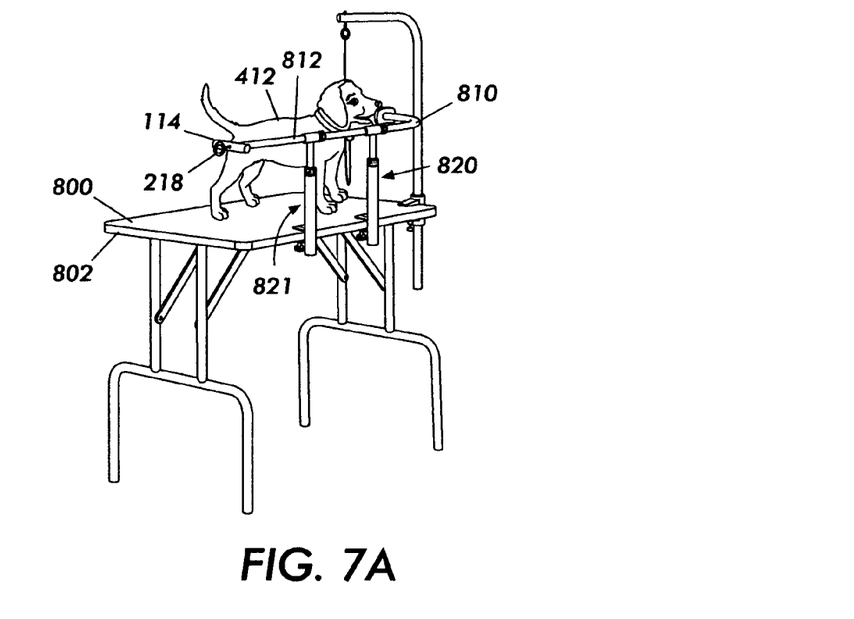
FIG. 7A is a perspective view of a first embodiment of the applicant's pet training device incorporated into a grooming table.

FIG. 7A is a perspective view of a first embodiment of the applicant's pet training device incorporated into a grooming table. Referring to FIG. 7A, training device 810 is joined to grooming table 800 by at least one support means 820. In the preferred embodiment, device 810 is supported by support means 820 and 821. Device 810 of FIG. 7A is a substantially L-shaped device similar to device 110 of FIG. 1, such that handle 114 and thumb ring 218 are disposed above and proximate to the short edge 802 of table 800. Such an arrangement is preferable if the groomer (not shown) prefers to stand next to short edge 802 while grooming canine 412.

Figure 7B:
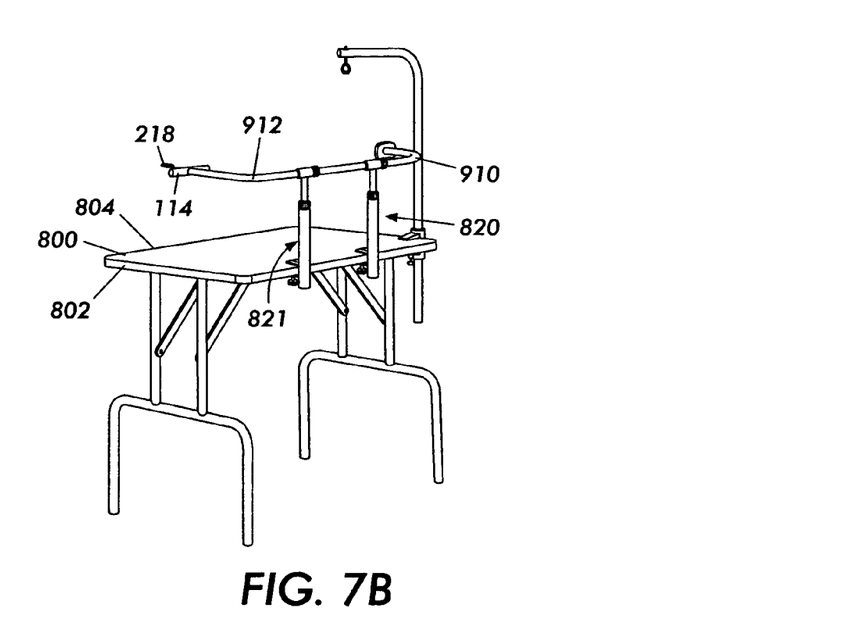
FIG. 7B is a perspective view of a second embodiment of the applicant's pet training device incorporated into a grooming table.

FIG. 7B is a perspective view of a second embodiment of the applicant's pet training device incorporated into a grooming table. Referring to FIG. 7B, training device 910 is also joined to grooming table 800 by at least one support means 820, and preferably by support means 820 and 821. Device 910 of FIG. 7A is a substantially U-shaped device comprising an additional elbow 912, such that handle 114 and thumb ring 218 are disposed above and proximate to the long edge 804 of table 800. Such an arrangement is preferable if the groomer (not shown) prefers to stand next to long edge 804 while grooming canine 412.

It will be apparent that the relative positions of devices 810 and 910 of FIGS. 7A and 7B upon table 800 are easily reversed to accommodate variance among groomers for either a left-handed or right-handed arrangement of such devices upon table 800.

Figure 7C:
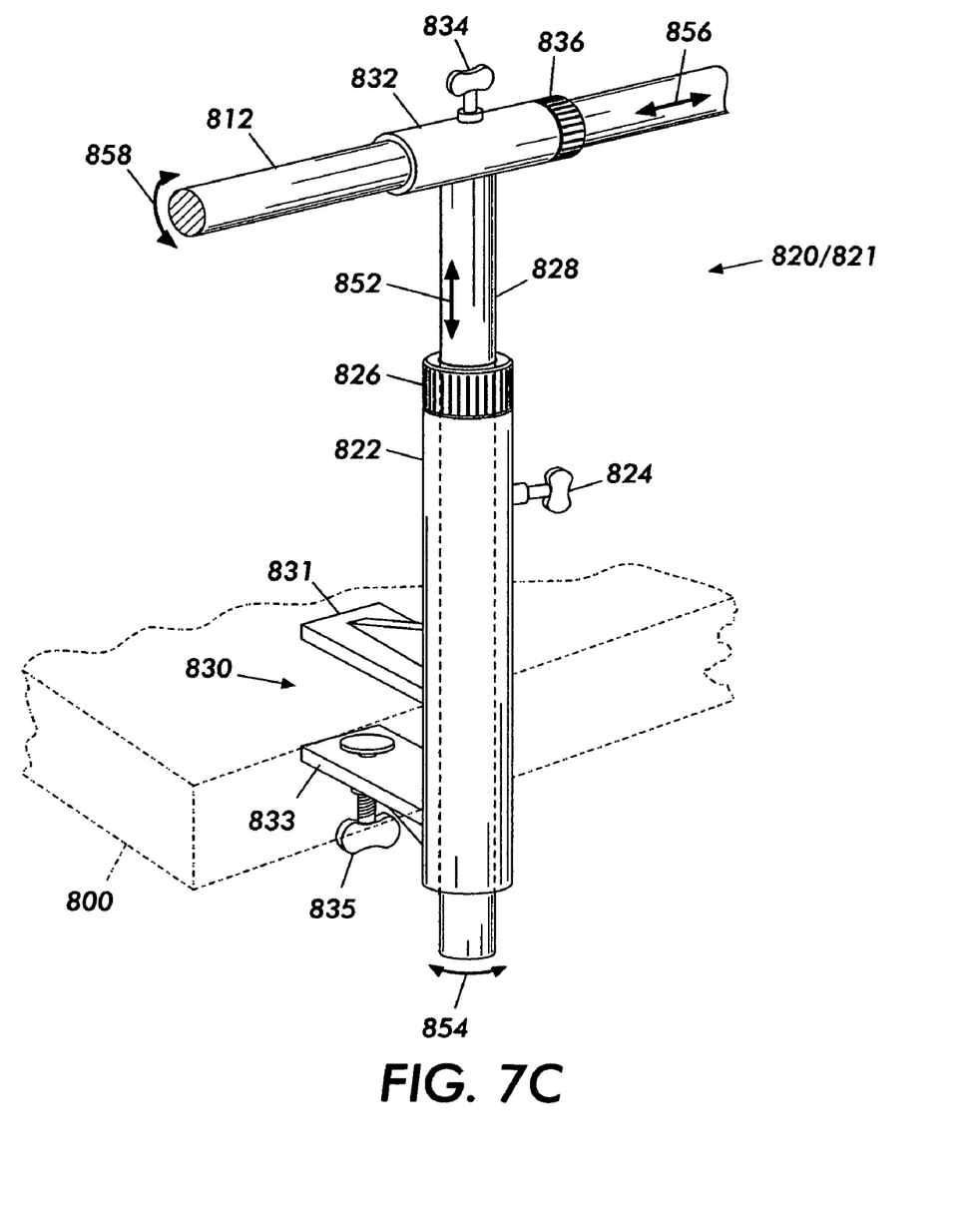
FIG. 7C is a detailed perspective view of adjustable support means used to support and secure the embodiments of FIGS. 7A and 7B to a grooming table.

FIG. 7C is a detailed perspective view of adjustable support means 820/821 used to support and secure the devices 810 and 910 of FIGS. 7A and 7B to a grooming table. Referring to FIG. 7C, support means 820/821 is preferably an adjustable support means comprising a riser sleeve 822 that is joined to table 800 by clamp means 830 comprised of top pad 831, bottom pad 833, and thumb screw 835 threadedly engaged with bottom pad 833. Riser sleeve 822 further comprises fastening means to secure riser tube 828, which is disposed through riser sleeve 822. In one embodiment, such fastening means comprises a thumbscrew 824 threadedly engaged through the wall of riser sleeve 822. In another embodiment, such fastening means comprises a compression fitting 826, which is comprised of a rotatable nut, and a ferrule disposed therein (not shown), such that when compression fitting 826 is tightened, riser tube 828 is rendered immobile in riser sleeve 822. Such compression fittings are well known in the art. Thus the use of such fastening means provides for riser tube 828 being vertically and rotatably adjustable in riser sleeve 822 as indicated by arrows 852 and 854.

Referring again to FIG. 7C, support means 820/821 is preferably further comprises cross sleeve 832 that is joined to riser sleeve 828. Cross sleeve 832 further comprises fastening means to engage and secure training device housing tube 812 therein, which is disposed through cross sleeve 832. (See also FIG. 7A and FIG. 1: In device 810 of FIG. 7A, housing tube 812 is equivalent to down tube 112 of FIG. 1, although housing tube 812 is not disposed vertically. In the device 810 of FIG. 7A, the proximal end thereof comprised of handle 114 and thumb ring 218 is equivalent to the upper end of the device 110 of FIG. 1; and the distal end of device 810 comprises a cavity for housing edible rewards for dispensing to canine 412 that is equivalent to the cavity 116 of device 110 of FIG. 1.) In one embodiment, such fastening means comprises a thumbscrew 834 threadedly engaged through the wall of cross sleeve 832. In another embodiment, such fastening means comprises a compression fitting 836, similar to compression fitting 826 described previously. The use of such fastening means provides for device housing tube 812 being horizontally and rotatably adjustable in cross sleeve 832 as indicated by arrows 856 and 858.

It will be apparent to those skilled in the art that adjustable support means 820/821 may be provided in many different forms that are equivalent in their function. Such adjustable support means are well known and used in structures such as e.g. camera tripods and camping tents. The operative requirement for such support means is that the positions of devices 810 and 910 of FIGS. 7A and 7B with respect to table 800 are rendered adjustable vertically, horizontally, and rotationally.

In recapitulation, the present invention is an apparatus for training of domestic animals, and in particular, an apparatus for the training of canines by dispensing edible rewards as compensation for exhibiting a desired behavior or action.

It is, therefore, apparent that there has been provided, in accordance with the present invention, an apparatus for the training of domestic animals, and more particularly for the training of canines. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A pet training device comprising:
   a) a rigid tube formed with a proximal end, at least one elbow, and a distal end;
   b) a handle, attached at said proximal end of said rigid tube;
   c) a flexible plunger rod disposed within said rigid tube, comprising a proximal end extending through said handle, and a distal end extending proximate to said distal end of said rigid tube;
   d) a thumb ring joined to said proximal end of said flexible plunger rod;
   e) a plunger joined to said distal-end of said flexible plunger rod; and
   f) a dispensing assembly comprising a tee having an inner branch joined to said distal end of said rigid tube; a center port including a storage tube joined thereto for storage of edible rewards; an outer branch; and a breech disposed between said inner branch, said center port, and said outer branch, wherein said plunger is disposed in at least a portion of said inner branch of said tee and said plunger is displaceable through said breech of said tee.

2. The pet training device as recited in claim 1, further comprising a plate-like bite shield joined to said outer branch of said tee, said bite shield having a diameter sufficient to prevent a pet from engaging said bite shield between its teeth.

3. The pet training device as recited in claim 1, wherein the device is comprised of at least about 90 weight percent of plastic.

4. The pet training device as recited in claim 1, further comprising at least one solid edible reward disposed in said breech of said tee of said dispensing assembly.

5. A pet training device comprising:
 a) a rigid tube formed with a proximal end, at least one elbow, and a distal end;
 b) a handle, attached at said proximal end of said rigid tube;
 c) a flexible plunger rod disposed within said rigid tube, comprising a proximal end extending through said handle, and a distal end extending proximate to said distal end of said rigid tube;
 d) a thumb ring joined to said proximal end of said flexible plunger rod;
 e) a plunger joined to said distal-end of said flexible plunger rod;
 f) a dispensing assembly comprising a tee having an inner branch joined to said distal end of said rigid tube; a center port including a storage tube joined thereto for storage of edible rewards; an outer branch; and a breech disposed between said inner branch, said center port, and said outer branch, wherein said plunger is disposed in at least a portion of said inner branch of said tee and said plunger is displaceable through said breech of said tee; and
 g) a plate-like bite shield joined to said outer branch of said tee, said bite shield having a diameter sufficient to prevent a pet from engaging said bite shield between its teeth.

6. The pet training device as recited in claim 5, wherein the device is comprised of at least about 90 weight percent of plastic.

7. The pet training device as recited in claim 5, further comprising at least one solid edible reward disposed in said breech of said tee of said dispensing assembly.

* * * * *